US011168617B2

(12) United States Patent
Kupratis et al.

(10) Patent No.: US 11,168,617 B2
(45) Date of Patent: Nov. 9, 2021

(54) ELECTRIC ENHANCED TRANSMISSION FOR MULTI-SPOOL LOAD-SHARING TURBOFAN ENGINE

(71) Applicant: Raytheon Technologies Corporation, Farmington, CT (US)

(72) Inventors: Daniel Bernard Kupratis, Wallingford, CT (US); Coy Bruce Wood, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 355 days.

(21) Appl. No.: 16/261,688

(22) Filed: Jan. 30, 2019

(65) Prior Publication Data

US 2020/0240331 A1 Jul. 30, 2020

(51) Int. Cl.
| *F02C 7/36* | (2006.01) |
| *F01D 15/12* | (2006.01) |
| *F01D 25/36* | (2006.01) |
| *F02C 7/275* | (2006.01) |
| *F02K 3/06* | (2006.01) |
| *F16H 3/72* | (2006.01) |

(Continued)

(52) U.S. Cl.
CPC .............. *F02C 7/36* (2013.01); *F01D 15/12* (2013.01); *F01D 25/36* (2013.01); *F02C 7/275* (2013.01); *F02K 3/06* (2013.01); *F16H 3/727* (2013.01); *H02K 7/1823* (2013.01); *H02K 16/02* (2013.01); *F05D 2220/323* (2013.01); *F05D 2220/76* (2013.01); *F05D 2260/40311* (2013.01); *F05D 2270/20* (2013.01)

(58) Field of Classification Search
CPC ............... F02C 7/32; F02C 7/36; F02C 7/113
See application file for complete search history.

(56) References Cited

U.S. PATENT DOCUMENTS

| 4,220,057 A | * | 9/1980 | Kronogard | ................ F02C 7/36 60/792 |
| 5,694,765 A | * | 12/1997 | Hield | ........................ F02C 7/32 60/39.163 |

(Continued)

OTHER PUBLICATIONS

European Search Report for European Application No. 20154342.8 dated Jun. 15, 2020.

*Primary Examiner* — Gerald L Sung
*Assistant Examiner* — Marc J Amar
(74) *Attorney, Agent, or Firm* — Carlson, Gaskey & Olds, P.C.

(57) ABSTRACT

A turbofan engine includes a first spool including a first turbine, and a first tower shaft engaged to the first spool. A second spool includes a second turbine, and a second tower shaft is engaged to the second spool. A superposition gearbox includes a sun gear, a plurality of intermediate gears engaged to the sun gear, and is supported in a carrier and a ring gear circumscribing the intermediate gears. The first tower shaft or the second tower shaft drives one of the intermediate gears. A drive motor is engaged to drive the sun gear, an inner electric motor, a stator disposed radially outside of the inner electric motor, and an outer electric motor disposed radially outside the stator. A first load on the first spool and a second load on the second spool is adjusted by operation of at least one of the inner electric motor and the outer electric motor.

12 Claims, 8 Drawing Sheets

(51) Int. Cl.
*H02K 7/18* (2006.01)
*H02K 16/02* (2006.01)

(56) References Cited

U.S. PATENT DOCUMENTS

| | | | | |
|---|---|---|---|---|
| 6,710,492 | B2* | 3/2004 | Minagawa | H02K 16/02 310/113 |
| 7,168,913 | B2* | 1/2007 | Lardellier | F02C 7/32 415/122.1 |
| 7,758,302 | B2* | 7/2010 | Linet | F02C 7/36 415/68 |
| 7,788,898 | B2* | 9/2010 | Kern | F02C 7/36 60/204 |
| 8,231,504 | B2* | 7/2012 | Hendrickson | B60K 6/448 477/5 |
| 10,094,295 | B2 | 10/2018 | Ullyott et al. | |
| 10,513,986 | B2* | 12/2019 | Auker | F01D 15/10 |
| 2008/0006023 | A1* | 1/2008 | Lardellier | H02K 16/005 60/226.1 |
| 2008/0142284 | A1* | 6/2008 | Qu | H02K 16/02 180/65.6 |
| 2008/0200299 | A1 | 8/2008 | Russ | |
| 2009/0015011 | A1* | 1/2009 | Colin | H02K 16/005 290/52 |
| 2010/0326050 | A1* | 12/2010 | Schilling | F01D 15/10 60/268 |
| 2011/0101693 | A1* | 5/2011 | Goi | F02C 7/275 290/46 |
| 2011/0148237 | A1* | 6/2011 | Toot | H02K 16/02 310/114 |
| 2011/0154827 | A1* | 6/2011 | Ress, Jr. | F02C 7/36 60/772 |
| 2013/0247539 | A1* | 9/2013 | Hoppe | F01D 15/10 60/39.15 |
| 2018/0094589 | A1* | 4/2018 | Auker | F01D 15/10 |
| 2018/0097427 | A1* | 4/2018 | Auker | H02K 7/1823 |
| 2018/0149091 | A1* | 5/2018 | Howell | F16H 37/065 |
| 2018/0209350 | A1* | 7/2018 | Kupratis | F02C 9/26 |
| 2018/0266329 | A1 | 9/2018 | Mackin | |
| 2020/0216183 | A1* | 7/2020 | Veilleux, Jr. | B60L 50/10 |
| 2020/0386188 | A1* | 12/2020 | Kupratis | F02C 7/275 |

* cited by examiner

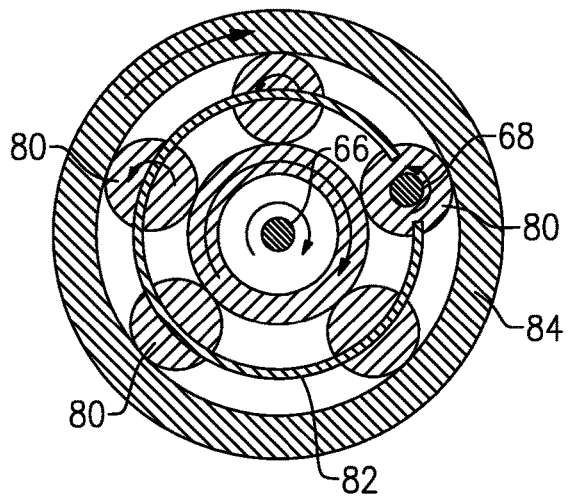
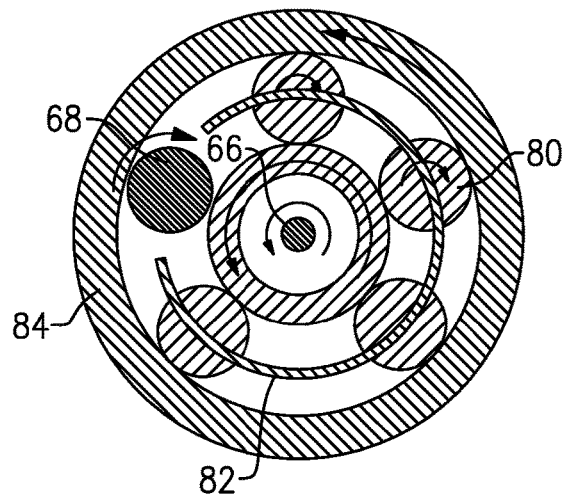
FIG.3  FIG.4
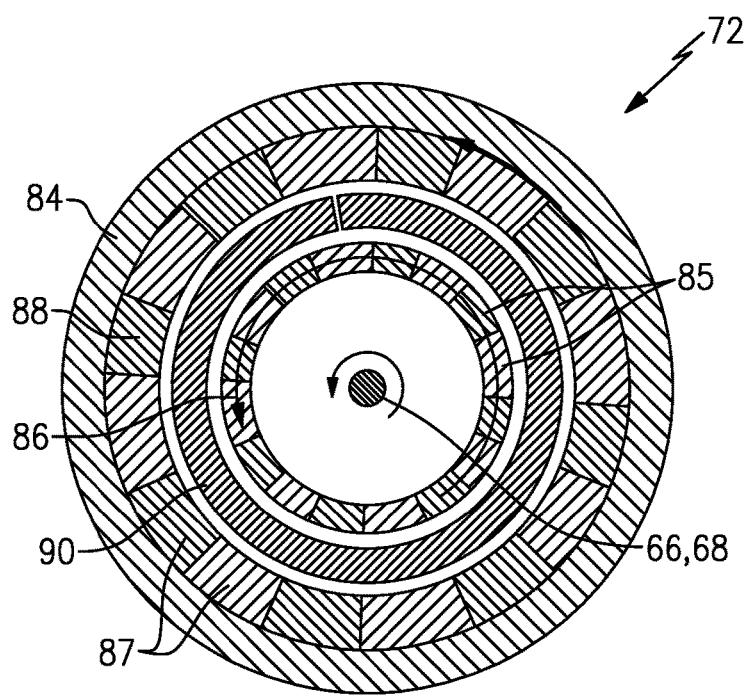
FIG.5

ELECTRIC ENHANCED TRANSMISSION FOR MULTI-SPOOL LOAD-SHARING TURBOFAN ENGINE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Incorporation of electric power in gas turbine engines is currently substantially limited to accessory components. Advances in electric motors and generators along with demands for ever increasing engine operating efficiencies warrant consideration of alternate engine configurations.

Turbine engine manufacturers continue to seek improvements to engine performance including improvements to propulsive efficiencies.

SUMMARY

A turbofan engine according to an exemplary embodiment of this disclosure, includes, among other possible things, a first spool including a first turbine and a first tower shaft engaged to the first spool. A second spool includes a second turbine, and a second tower shaft is engaged to the second spool. A superposition gearbox includes a sun gear, a plurality of intermediate gears engaged to the sun gear, and is supported in a carrier and a ring gear circumscribing the intermediate gears. One of the first tower shaft or the second tower shaft drives one of the intermediate gears. A drive motor is engaged to drive the sun gear, an inner electric motor, a stator disposed radially outside of the inner electric motor; and an outer electric motor disposed radially outside the stator. A first load on the first spool and a second load on the second spool is adjusted by operation of at least one of the inner electric motor and the outer electric motor.

In a further embodiment of the foregoing turbofan engine, the carrier is fixed to a static structure of the turbofan engine.

In a further embodiment of any of the foregoing turbofan engines, the first tower shaft and the second tower shaft are disposed within a common radial plane.

In a further embodiment of any of the foregoing turbofan engines, the stator is fixed to the static structure of the turbofan engine.

In a further embodiment of any of the foregoing turbofan engines, the first tower shaft is engaged to drive the inner electric motor and the ring gear is engaged to drive the outer electric motor.

In a further embodiment of any of the foregoing turbofan engines, the second tower shaft is engaged to drive the inner electric motor and the ring gear is engaged to drive the outer electric motor.

In a further embodiment of any of the foregoing turbofan engines, the first spool includes a first compressor section coupled to a first turbine section. The first tower shaft and the second tower shaft are disposed forward of the first compressor section.

In a further embodiment of any of the foregoing turbofan engines, the second spool includes a second compressor section that is disposed forward of the first tower shaft and the second tower shaft.

In a further embodiment of any of the foregoing turbofan engines, a controller is in electric communication with the drive motor, the inner electric motor and the outer electric motor. The controller proportions the first load and the second load between the first spool and the second spool by controlling a speed of the drive motor and a stator field of the inner electric motor and the outer electric motor.

Another turbofan engine according to an exemplary embodiment of this disclosure includes, among other possible things, a first spool including a first turbine and a second spool including a second turbine. A superposition gearbox is disposed about an axis and includes a sun gear, a plurality of intermediate gears engaged to the sun gear and supported in a carrier and a ring gear circumscribing the intermediate gears. A drive means is engaged to drive the sun gear. An integrated motor generator is disposed about the axis and includes an inner armature and an outer armature rotatable relative to a fixed stator disposed radially between the inner armature and the outer armature. One of the inner armature and the outer armature is mechanically coupled to the first spool and the other of the inner armature and the outer armature is coupled to a portion of the superposition gearbox. A first load on the first spool and a second load on the second spool is adjusted by modification of stator fields of the inner armature and the outer armature.

In a further embodiment of the foregoing turbofan engine, the carrier is fixed to the static structure of the turbofan engine.

In another embodiment of the any of the foregoing turbofan engines, a first tower shaft is engaged to be driven by the first spool and a second tower shaft is engaged to be driven by the second spool. The one of the first tower shaft and the second tower shaft drive one of the intermediate gears and the other of the first tower shaft and the second tower shaft drive one of the inner armature or the outer armature.

In another embodiment of the any of the foregoing turbofan engines, the drive means comprises an electric motor.

In another embodiment of the any of the foregoing turbofan engines, a controller is in electric communication with the drive motor and the integrated motor generator for proportioning the first load and the second load between the first spool and the second spool, by controlling a speed of the drive motor and stator fields of the inner armature and the outer armature.

A method of proportioning a load between spools of a turbofan engine according to an exemplary embodiment of this disclosure includes, among other possible things, coupling an intermediate gear of a superposition gearbox to a first spool. The superposition gearbox includes a sun gear, a plurality of intermediate gears and a ring gear circumscribing the plurality of the intermediate gears. A first portion of an integrated motor generator is coupled to a second spool. A second portion of the integrated motor generator is coupled to the superposition gearbox. The sun gear is coupled to a drive means, controlling a speed of the sun gear with the drive means. A stator field of the integrated motor generator is controlled to proportion a load between the first spool and the second spool.

In a further embodiment of the foregoing method of proportioning a load between spools of a turbofan engine, the first spool drives with the integrated motor/generator for starting the turbofan engine.

In a further embodiment of any of the foregoing methods of proportioning a load between spools of a turbofan engine, the carrier is fixed to a static structure of the turbofan engine and the drive means comprises an electric motor driving the sun gear of the superposition gearbox.

In a further embodiment of any of the foregoing methods of proportioning a load between spools of a turbofan engine, the integrated motor generator includes an inner armature and an outer armature disposed between a fixed stator and controlling a load between the first spool and the second spool. A stator field is adjusted between each of the inner armature and the outer armature.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a schematic view of a portion of an example superposition gearbox embodiment of the system.

FIG. 4 is a schematic view of another portion of the example superposition gearbox embodiment.

FIG. 5 is a schematic view of an example integrated generator motor embodiment of the system.

DETAILED DESCRIPTION

Figure 1:
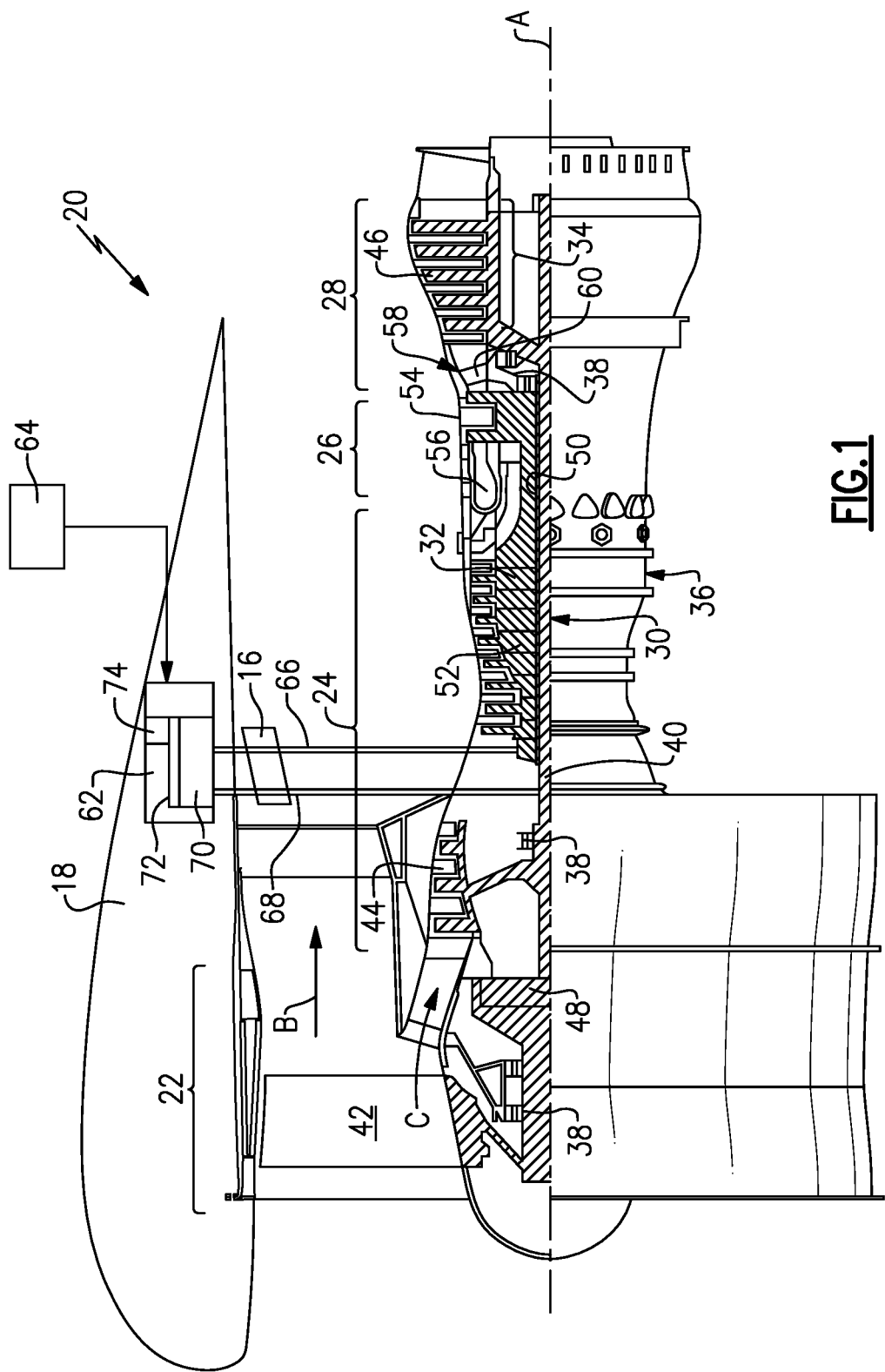
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a low pressure compressor 44 and a low pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a high pressure compressor 52 and a high pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]$^{0.5}$. The "Low corrected fan tip speed" as disclosed herein according to one non-limiting embodiment is less than about 1150 ft/second (350.5 meters/second). The fan tip speed is measured at one of the bucket cruise and take-off operating conditions of the engine 20.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Changes in environmental conditions can require constant adaptations and adjustments to engine operation to provide a desired propulsive output. For example, fuel flow to the combustor 56 may be adjusted depending both on a desired propulsive power output and input airflow characteristics including pressure and temperatures. Changes in input airflows may change during operation and require adjustment of fuel flow to maintain the desired propulsive output. There is a certain lag between the adjustment and obtaining the operating propulsive output. Although very brief, the lag can affect engine efficiency.

Moreover, changes in power provided by the low pressure turbine 46 driving fan section 22 also will add power to the low pressure compressor 44 and thereby complicate operation. The low pressure compressor 44 matches operation to that of the high pressure compressor 52 and thereby any adjustment to one results in changes to the other. Excessive power input into the low pressure compressor 44 may require that air flow be bled off in order to properly match operation of the high pressure compressor 52.

The example gas turbine engine 20 includes an enhanced electric transmission system 62 that enables load sharing between the spools 30, 32. The example transmission system 62 includes a superposition gearbox 70 that is driven by one of a first tower shaft 66 coupled to the high speed spool 32 and a second tower shaft 68 coupled to the low speed spool 30. An integrated motor/generator 72 is coupled to the superposition gearbox 70. An aircraft controller schematically indicated at 64 controls operation of the superposition gearbox 70 and the motor/generator 72 in concert with a drive motor 74 to distribute loads between the low speed spool 30 and the high speed spool 32.

In this disclosed embodiment, the first tower shaft 66 and the second tower shaft 68 are disposed within a common radial plane schematically illustrated at 16. It should be appreciated that the tower shafts 66 and 68 may be coupled in other manners and disposed within different planes as is required for a specific engine configuration. Moreover, the spools 30, 32 may be co-rotating or counter-rotating depending on the engine configuration and remain within the contemplation of this disclosure.

Figure 2:
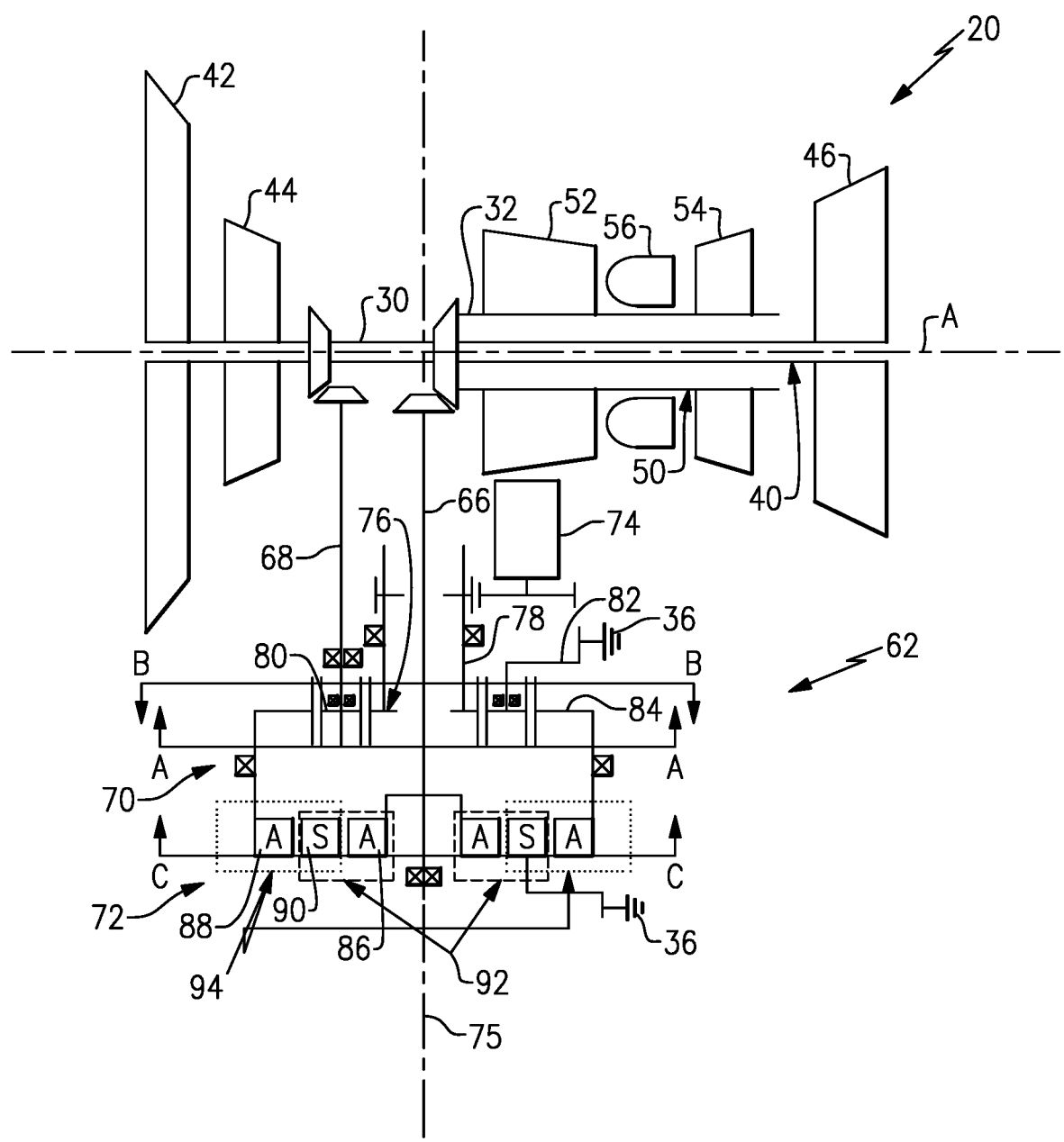
FIG. 2 is a schematic view of a gas turbine engine including an electric enhanced transmission system for multi-spool load sharing.

Referring to FIG. 2, the example electric enhanced transmission system 62 is schematically shown with the superposition gearbox 70 and the motor/generator 72 coupled to the engine 20. The motor/generator 72 is coupled to portions of the superposition gearbox 70 and also is driven by one of the first and second tower shafts 66, 68.

The disclosed superposition gearbox 70 is an epicyclic gearbox that includes a sun gear 76 that rotates about an axis 75 and drives intermediate gears 80 supported within a carrier 82. In this example, the carrier 82 is fixed to the static structure 36 of the turbofan engine 20. The fixed carrier 82 maintains the axes of rotation for each of the intermediate gears 80. A ring gear 84 is disposed about the plurality of intermediate gears 80 and is free to rotate about the axis 75 in response to driving engagement by the intermediate gears 80.

A drive means 74 is coupled to the sun gear 76 through a sun shaft 78. In this example embodiment, the drive means 74 is an electric motor 74. The electric motor 74 therefore drives the sun gear 76 of the superposition gearbox 70. In this disclosed example illustrated in FIG. 2, the second tower shaft 68 coupled to the low speed spool 30 is engaged to drive one of the intermediate gears 80 supported within a carrier 82. The other intermediate gears 80 operate as conventionally utilized in an epicyclic gear system. Accordingly, the superposition gearbox 70 includes a first drive input from the electric motor 74 to drive the sun gear 76 and a second drive input from the second tower shaft 68 to drive one of the intermediate gears 80. The ring gear 84 is coupled to a portion of the integrated motor generator 72 to provide a third drive input to the gearbox 70.

Referring to FIGS. 3, 4 and 5 with continued reference to FIG. 2, the motor/generator 72 includes a stator 90 that is fixed to a static structure 36. An inner armature 86 is disposed radially inward of the stator 90 and an outer armature 88 is disposed radially outward of the stator 90. The inner armature 86 and the outer armature 88 are annular structures that rotate relative to the fixed stator 90. The stator 90 is electrically coupled to both the inner and outer armatures 86, 88. The outer armature 88, along with the stator 90, defines an outer motor/generator 94. The inner armature 86 along with the same stator 90 defines an inner motor/generator 92. The inner armature 86 and the outer armature 88 can be permanent magnets or conventional windings.

The example superposition gearbox 70 includes a first input from the second tower shaft 68 from the low speed spool 30 and a second input to the sun gear 76 by the electric motor 74. The first tower shaft 66 extends through the superposition gearbox 70 along the axis 75 to the motor/generator and is not mechanically coupled to the gearbox 70.

The integrated motor generator 72 is driven in part by the ring gear 84 from the superposition gearbox 70 and by the first tower shaft 66. Alternatively, the motor/generator 72 can be operated as an electric motor to drive the first tower shaft 66. In this disclosed embodiment, the ring gear 84 drives the outer armature 88 relative to the static stator 90.

The first tower shaft 66 drives the inner armature 86 relative to the same stator 90. It should be appreciated that although the first tower shaft 66 is shown engaged to the inner armature 86 that the inputs to the motor/generator 72 may be modified such that the second tower shaft 68 driven by the low speed spool 30 could be configured to drive the inner armature 86 instead of the first tower shaft 66. Similarly, the intermediate gear 80 could be alternatively driven by the first tower shaft 66 instead of the second tower shaft 68 as shown in FIG. 2.

The inner armature 86 of the inner motor/generator 92 includes a plurality of poles 85. The outer armature 88 of the outer/motor generator 94 includes a plurality of poles 87. The stator is configured to correspond with the number of poles 85, 87 within each of the inner and outer motor/generators 92, 94. The number of poles 85, 87 along with the configuration of the stator 90 is determined in view of the speed relationships provided by the superposition gearbox 70 along with the relative speeds of the low speed and high speed spools 30, 32. Additionally, although an example motor/generator configuration is disclosed, other electric motor configurations could also be utilized and are within the contemplation and scope of this disclosure.

Figure 6:
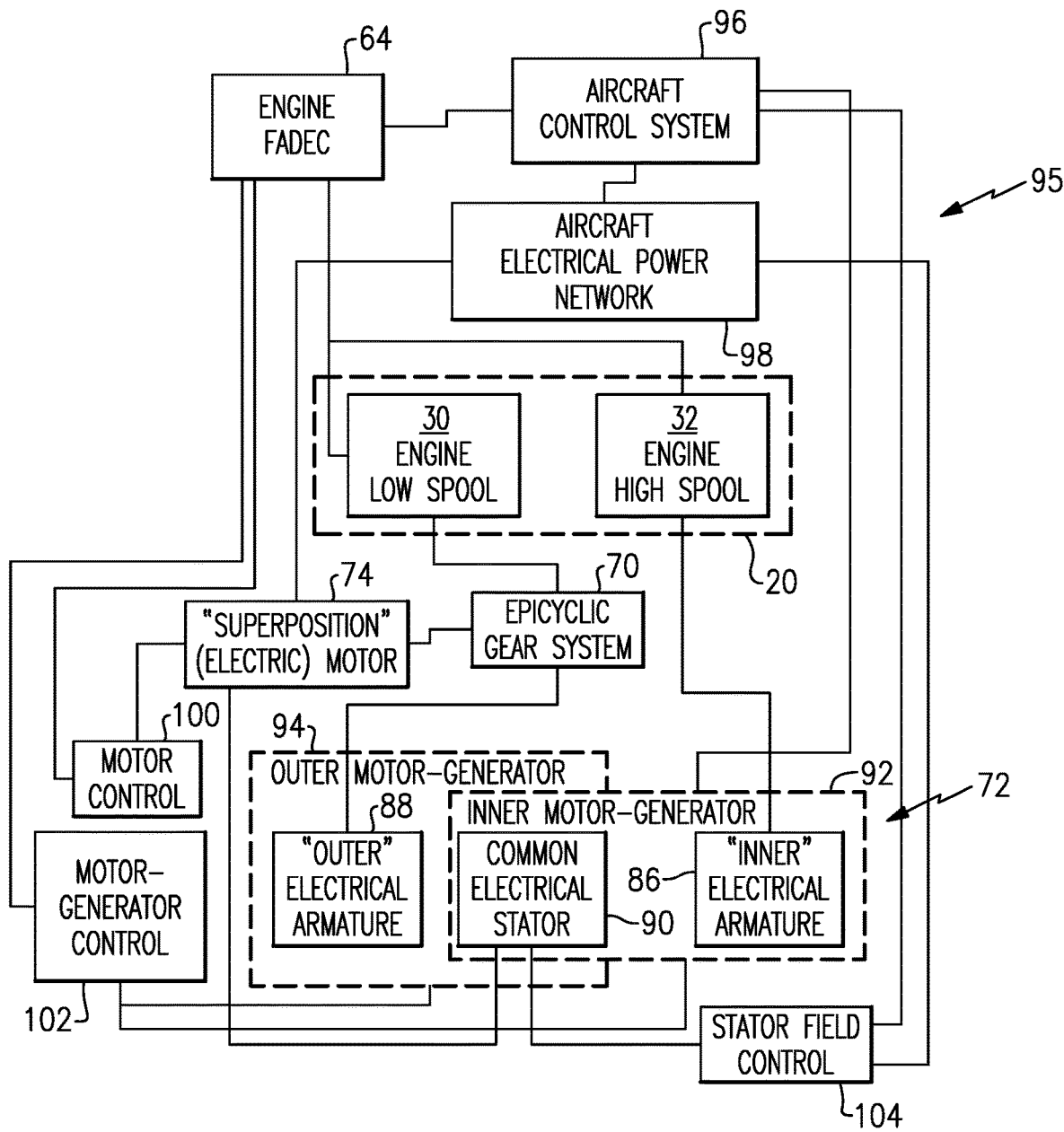
FIG. 6 is a block diagram of an example control system for the enhanced transmission system.

Referring to FIG. 6 with continued reference to FIGS. 2-5, an example control system 95 includes the FADEC 64 that receives information from an aircraft control system 96. The aircraft control system 96 is also in communication and controls an aircraft electric power network 98. Electric power from the aircraft electric power network 98 can be provided to the drive motor 74 to provide control over operation of the superposition gearbox 70. Alternatively, electric power from the motor/generator 72 may be provided for operation of the drive motor 74. The example control system 95 includes a motor controller 100 that receives information from the engine FADEC 64. The FADEC also controls a motor controller 102 in communication with the motor/generator 72. The motor/generator control 102 controls operation of the stator 90 along with a stator field control 104. It should be appreciated, that the control system 95 may be of different configurations and implemented as a separate system or as part of the overall engine and/or aircraft control system. Moreover, the control system 95 would be modified to accommodate alternate disclosed system embodiments including different input configurations.

The transmission system 62 integrates the superposition gearbox 70 with the motor/generator 72 to facilitate the proportioning and sharing of loads across the high speed spool 32 and the low speed spool 30. In operation, the inner motor/generator 92 is driven by the first tower shaft 66 coupled to the high speed spool 32. The outer/generator 94 is driven by the superposition gearbox 70 through the ring gear 84. The stator 90 disposed between the inner motor/generator 92 and the outer motor/generator 94 is controlled to manipulate a field therebetween that is utilized to transfer loads between the low speed spool 30 and the high speed spool 32. The transfer of loads between the spools 30, 32 is transferred through a combination of power input and output. Operation of the motor/generators 92,94 enables power to be drawn from one spool and input into the other spool through the interface provided between the inner and outer motor/generators 92, 94.

The stator field control 104 changes the rate of rotation of the stator field about the axis 75 and the slip of the electro-magnetic field of the motor/generator 92 versus the electro-magnetic field of motor/generator 94. The electric motor 74 supplements the power variations of the varying slip. The transfer of loads enhances the rates of change of the rotational speeds of low speed spool 30 and high speed spool 32, for decelerations and accelerations of the spools.

In operation during a power increase of engine 20 as achieved by increasing the rate of fuel flow combusted in combustor 56, there can be an excessive acceleration of the rotational speed of high speed spool 32 and a lag in the acceleration of the rotational speed of the low speed spool 30 versus the rotational speed of the high speed spool 32. The acceleration of the low speed spool 30 can be controllably enhanced by drawing power from the high speed spool 32 by the inner motor-generator 92 and transferring the power to the outer motor generator 94. The power transferred to the low speed spool 30 by the motor generator 94 increases the rate of acceleration of the low speed spool 30 and reduces the lag between the accelerations of the spools. This reduces the time required to increase the power output of the engine 20 as critical during a go-around abort of landing an aircraft.

In operation during a power decrease of engine 20 as achieved by decreasing the rate of fuel flow combusted in combustor 56, there can be an insufficient deceleration of the rotational speed of low speed spool 30 and a lag in the deceleration of the rotational speed of the low speed spool 30 versus high speed spool 32. The deceleration of low speed spool 30 can be can be controllably enhanced by drawing power from the low speed spool 30 by the outer motor-generator 94 and transferring the power to the inner motor generator 92. The power transferred from the low speed spool 30 by the motor generator 94 increases the rate of deceleration of the low speed spool 30 and reduces the lag between spools. This reduces the time required to decrease the power output of engine 20 as critical in a steep approach for landing an aircraft. Smaller and more frequent changes in the power output of engine 20 as occurring during the cruise segment of an aircraft mission can be achieved similarly by the transfer of loads, but without a change in the rate of fuel flow combusted in combustor 56, by controlling motor generators 92, 92 with motor generator control 102 and controlling superposition motor 74 with motor control 100.

The transfer of loads enabled by superposition gearbox 70 and the motor/generators 92, 94 and the aircraft electric power network 98 and electric motor 74 enhance the safety of operation of multi-engine aircraft. There are operating points of altitude and flight speed that preclude a windmill starting of an engine due to inadequate wind milling of the low spool 30 by the fan 42. In the event two engines 20, 20 must be windmill started nearly simultaneously at these operating points, the wind milling of one fan 42 of engine 20 can transfer sufficient power through the aircraft electric power network 98 to a second wind milling engine 20 to achieve a start of the second engine.

Figure 7:
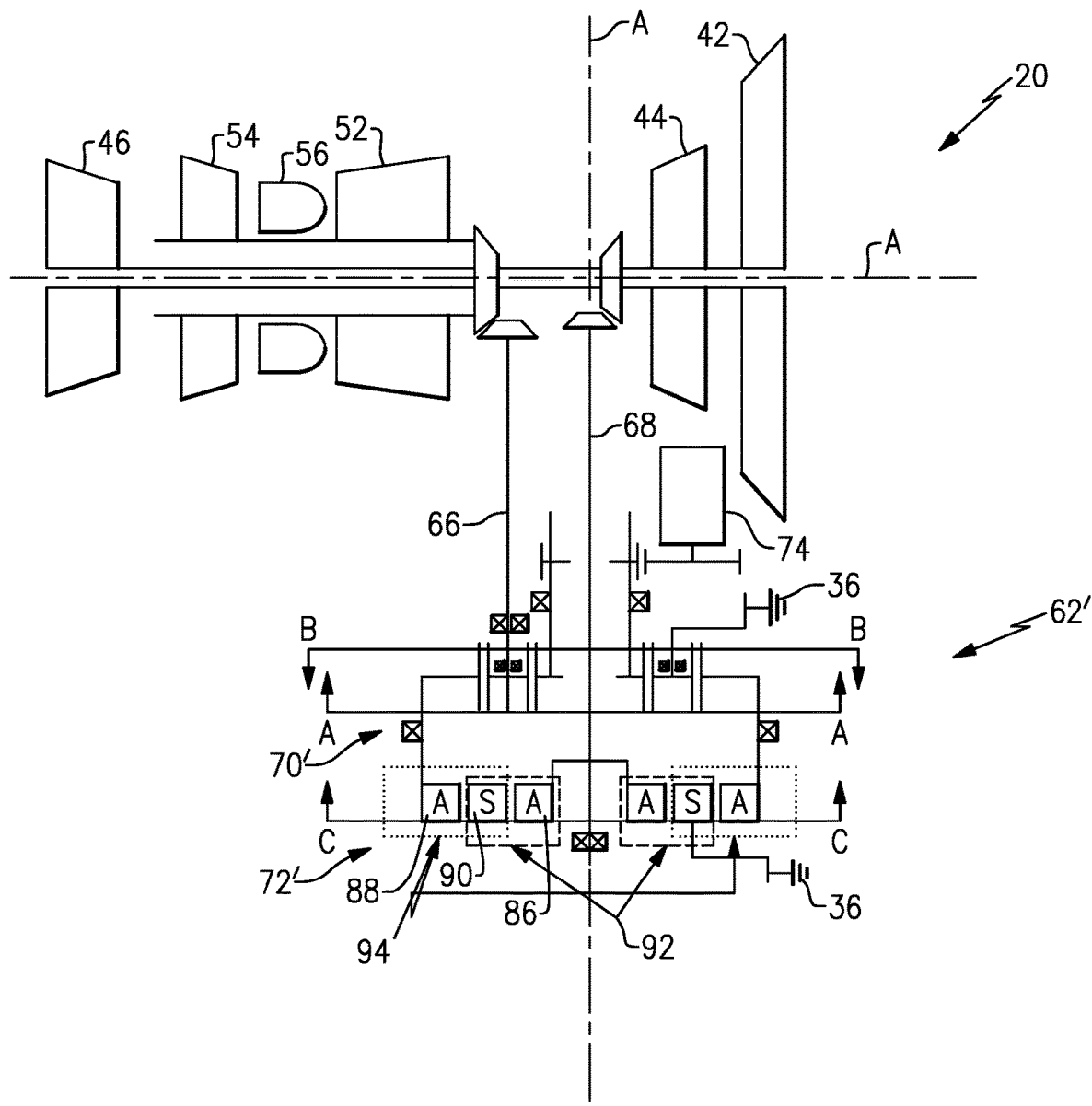
FIG. 7 is a schematic view of another turbofan engine including another example electric enhanced transmission system embodiment.

Referring to FIG. 7, with continued reference to FIGS. 3-5, the example gas turbofan engine 20 is schematically shown with an alternate configuration of the enhanced electric transmission system 62'. The system 62' includes the second tower shaft 68 extending through the superposition gearbox 70' and coupled to drive the inner armature 86 of the motor generator 72'. The first tower shaft 66 extends into the superposition gearbox 70' and drives the intermediate gear 80.

Figure 8:
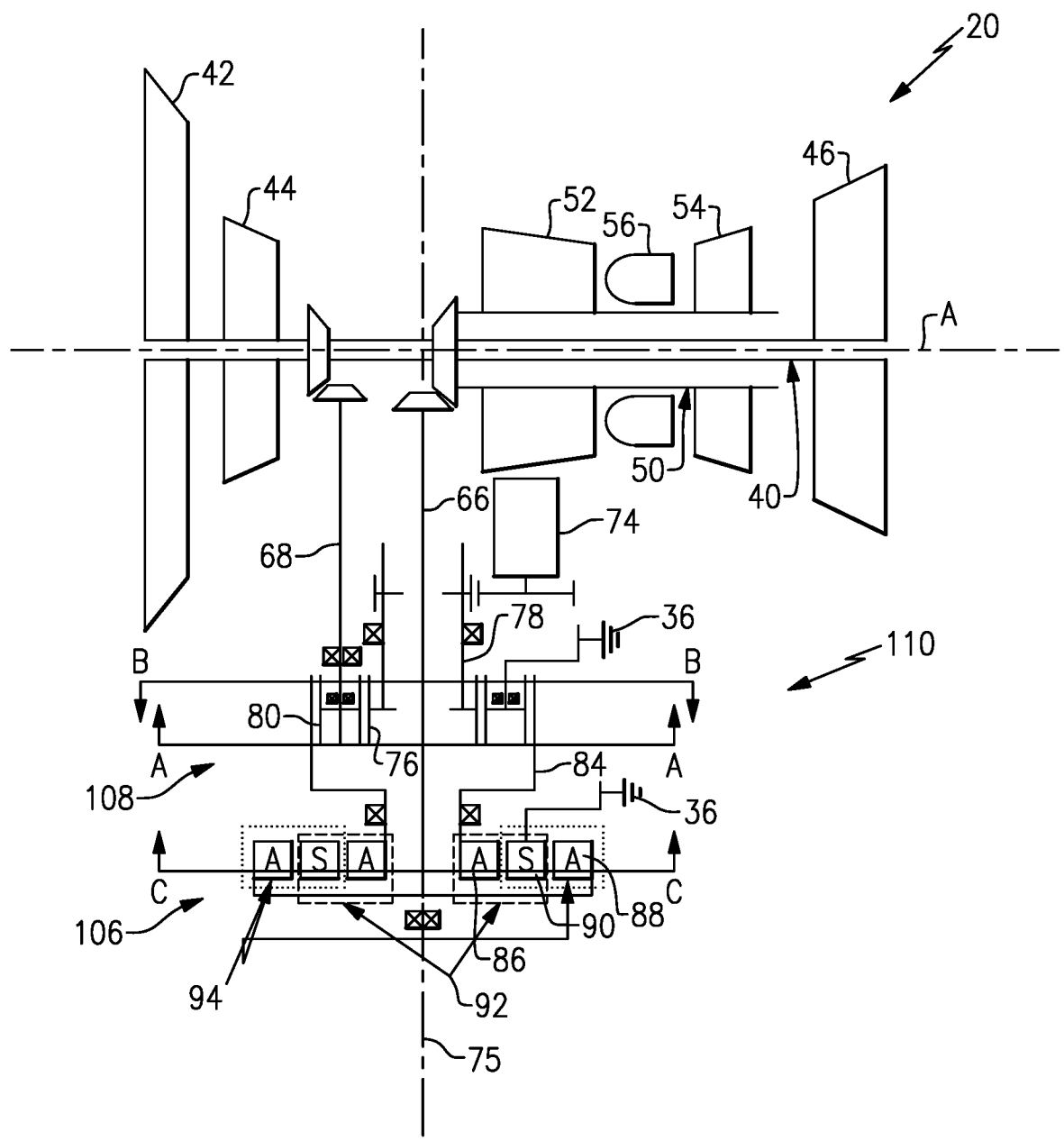
FIG. 8 is another turbofan engine including another example electric enhanced transmission system embodiment.
Figure 9:
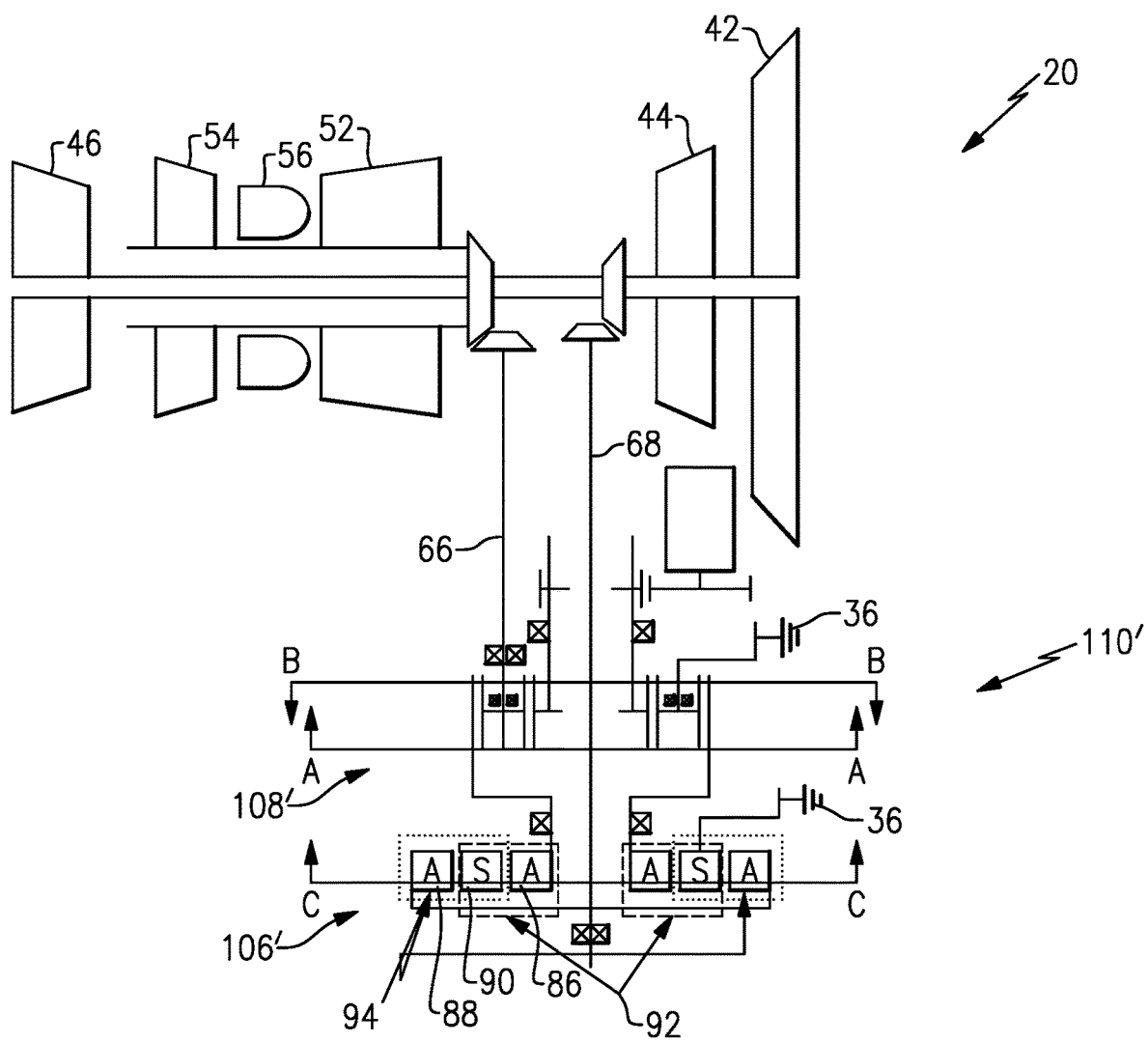
FIG. 9 is yet another example turbofan engine with another example enhanced transmission system embodiment.
Figure 10:
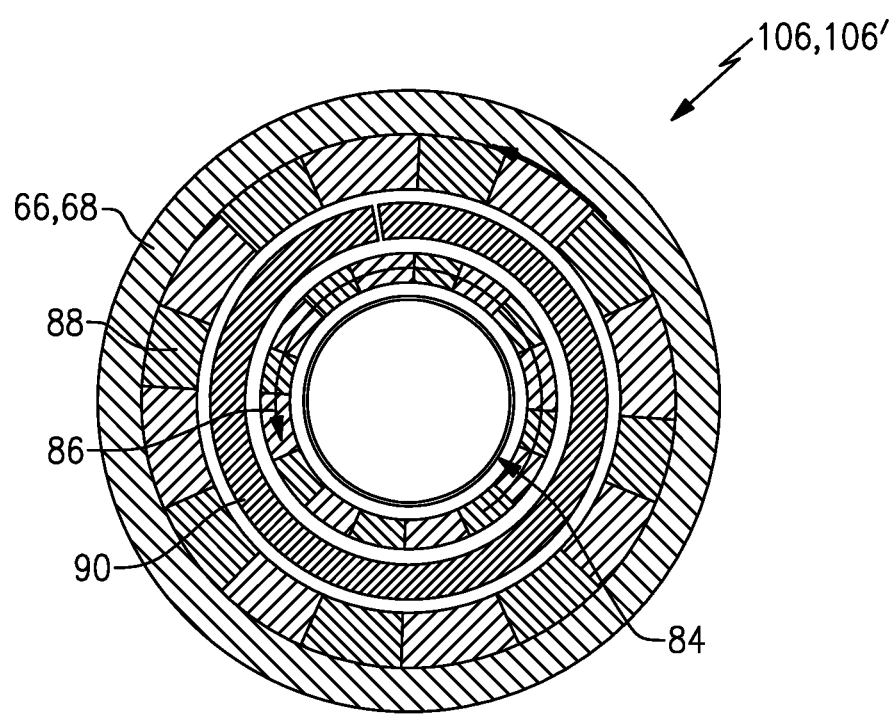
FIG. 10 is a schematic view of a portion of another integrated motor generator embodiment.

Referring to FIGS. 8, 9 and 10 alternate embodiments of the enhanced transmission system 110 and 110' illustrate additional examples of the superposition gearbox 108,108' and the motor/generator 106, 106'. In the disclosed embodiments 110, 110' the ring gear 84 drives the inner armature 86 and one of the first and second tower shafts 66, 68 drives the outer armature 88. FIG. 8 illustrates an embodiment of the transmission system 110 with the first tower shaft 66 coupling the high spool 32 to the outer armature 88. FIG. 9 illustrates an embodiment of the transmission system 110' with the second tower shaft 68 coupling the low spool 30 to the outer armature 88. It should be appreciated that the first and second tower shafts 66, 68 may be alternated between driving portions of the example motor/generators 106, 106' and portions of the superposition gearbox 108, 108'.

FIG. 10 illustrates the motor/generator 106, 106' with the outer armature 88 driven by one of the tower shafts 66, 68 and the inner armature 86 driven by the ring gear 84. The configurations of respective inner and outer armatures 86, 88 are modified to correspond with any corresponding differences in relative speeds necessary to implement operation of the motor/generator 106, 106'.

The integrated arrangement of superposition gearbox 70 with the inner and outer motor/generators 92,94 in combination with the drive motor 74 enables manipulation and control of load proportioning and sharing between the high and low spools.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising:
a first spool including a first turbine;
a first tower shaft engaged to the first spool;
a second spool including a second turbine;
a second tower shaft engaged to the second spool;
a superposition gearbox including a sun gear, a plurality of intermediate gears engaged to the sun gear and supported in a carrier and a ring gear circumscribing the intermediate gears, wherein one of the first tower shaft or the second tower shaft drives one of the intermediate gears;
a drive motor engaged to drive the sun gear;
an inner motor/generator including an inner armature and a stator disposed radially outside of the inner armature; and
an outer motor/generator including the stator and an outer armature disposed radially outside the stator, wherein a first load on the first spool and a second load on the second spool is adjusted by operation of at least one of the inner electric motor and the outer electric motor.

2. The turbofan engine as recited in claim 1, wherein the carrier is fixed to a static structure of the turbofan engine.

3. The turbofan engine as recited in claim 2, wherein the first tower shaft and the second tower shaft are disposed within a common radial plane.

4. The turbofan engine as recited as claim 1, wherein the stator is fixed to the static structure of the turbofan engine.

5. The turbofan engine as recited in claim 4, wherein the first tower shaft is engaged to drive the inner motor/generator and the ring gear is engaged to drive the outer motor/generator.

6. The turbofan engine as recited in claim 4, wherein the second tower shaft is engaged to drive the inner motor/generator and the ring gear is engaged to drive the outer motor/generator.

7. The turbofan engine as recited in claim 1, wherein first spool includes a first compressor section coupled to a first turbine section, the first tower shaft and the second tower shaft are disposed forward of the first compressor section.

8. The turbofan engine as recited in claim 7, wherein the second spool includes a second compressor section that is disposed forward of the first tower shaft and the second tower shaft.

9. The turbofan engine as recited in claim 1, including a controller in electric communication with the drive motor, the inner motor/generator and the outer motor/generator for proportioning the first load and the second load between the first spool and the second spool by controlling a speed of the drive motor and a stator field of the inner motor/generator and the outer motor/generator.

10. A turbofan engine comprising:
a first spool including a first turbine;
a second spool including a second turbine;
a superposition gearbox disposed about an axis and including a sun gear, a plurality of intermediate gears engaged to the sun gear and supported in a carrier and a ring gear circumscribing the intermediate gears, wherein the carrier is fixed to a static structure of the turbofan engine;
a drive means engaged to drive the sun gear;
an integrated motor generator disposed about the axis and including an inner armature and an outer armature rotatable relative to a fixed stator disposed radially between the inner armature and the outer armature, wherein one of the inner armature and the outer armature is mechanically coupled to the first spool and the other of the inner armature and the outer armature is coupled to a portion of the superposition gearbox and a first load on the first spool and a second load on the second spool is adjusted by modification of stator fields of the inner armature and the outer armature;
a first tower shaft engaged to be driven by the first spool; and
a second tower shaft engaged to be driven by the second spool, wherein the one of the first tower shaft and the second tower shaft drive one of the intermediate gears and the other of the first tower shaft and the second tower shaft drive one of the inner armature or the outer armature.

11. The turbofan engine as recited in claim 10, wherein the drive means comprises an electric motor.

12. The turbofan engine as recited in claim 11, including a controller in electric communication with the drive motor and the integrated motor generator for proportioning the first load and the second load between the first spool and the second spool by controlling a speed of the drive motor and stator fields of the inner armature and the outer armature.

* * * * *